United States Patent
Matsushima et al.

(10) Patent No.: US 12,080,476 B2
(45) Date of Patent: Sep. 3, 2024

(54) COIL COMPONENT AND WIRELESS POWER TRANSMITTING DEVICE HAVING THE SAME

(71) Applicant: TDK Corporation, Tokyo (JP)

(72) Inventors: Masaki Matsushima, Tokyo (JP); Noritaka Chiyo, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 17/573,983

(22) Filed: Jan. 12, 2022

(65) Prior Publication Data

US 2022/0230803 A1 Jul. 21, 2022

(30) Foreign Application Priority Data

Jan. 21, 2021 (JP) .................. 2021-007760

(51) Int. Cl.
| | | |
|---|---|---|
| *H01F 38/14* | (2006.01) | |
| *H01F 27/24* | (2006.01) | |
| *H01F 27/28* | (2006.01) | |
| *H02J 50/10* | (2016.01) | |

(52) U.S. Cl.
CPC ............. *H01F 38/14* (2013.01); *H01F 27/24* (2013.01); *H01F 27/2804* (2013.01); *H02J 50/10* (2016.02); *H01F 2027/2809* (2013.01)

(58) Field of Classification Search
None
See application file for complete search history.

(56) References Cited

U.S. PATENT DOCUMENTS

| | | | |
|---|---|---|---|
| 11,449,725 B2* | 9/2022 | Matsushima | .... G06K 19/07794 |
| 2014/0218262 A1 | 8/2014 | Tsubaki | |
| 2016/0013661 A1 | 1/2016 | Kurs et al. | |
| 2017/0005399 A1 | 1/2017 | Ito et al. | |
| 2017/0179773 A1* | 6/2017 | Kim | ......................... H04B 5/26 |
| 2018/0254552 A1* | 9/2018 | Ito | ............................. H04B 5/43 |
| 2019/0341692 A1* | 11/2019 | Kubo | ....................... G06K 7/10 |
| 2021/0367342 A1* | 11/2021 | Chiu | ..................... H02J 50/402 |
| 2022/0352752 A1* | 11/2022 | Chiyo | ..................... H02J 50/12 |
| 2023/0014542 A1* | 1/2023 | Song | ...................... H01F 27/366 |

FOREIGN PATENT DOCUMENTS

| | | | | |
|---|---|---|---|---|
| CN | 208423175 U | | 1/2019 | |
| DE | 102022110371 A1 * | | 11/2022 | ............. H01F 27/28 |
| GB | 2470113 A | | 11/2010 | |
| JP | 2016-1983 A | | 1/2016 | |
| WO | WO-2013073314 A1 * | | 5/2013 | ............... H01Q 1/38 |

* cited by examiner

Primary Examiner — Thomas J. Hiltunen
Assistant Examiner — Khareem E Almo
(74) Attorney, Agent, or Firm — Rimon P.C.

(57) ABSTRACT

Disclosed herein is a coil component that includes a first coil pattern, a second coil pattern connected to the first coil pattern, and a magnetic member covering the first and second coil patterns in an axial direction of the first and second coil patterns. The first and second coil patterns are arranged side by side in a first direction perpendicular to the axial direction. The first coil pattern has a first protrusion protruding in a second direction perpendicular to the axial direction and the first direction from a first outer peripheral end of the magnetic member in the second direction.

20 Claims, 8 Drawing Sheets

COIL COMPONENT AND WIRELESS POWER TRANSMITTING DEVICE HAVING THE SAME

CROSS-REFERENCE TO RELATED APPLICATION

This application claims the benefit of Japanese Patent Application No. 2021-007760, filed on Jan. 21, 2021, the entire disclosure of which is incorporated by reference herein.

BACKGROUND

Field

The present disclosure relates to a coil component and a wireless power transmitting device having the same.

Description of Related Art

International Publication WO 2013/073314 describes a method of adjusting an NFC (Near-Field Communication) communication coverage area. In this method, in addition to a main coil antenna, a sub-coil antenna connected to the main coil antenna is provided.

However, the method described in International Publication WO 2013/073314 cannot extend the communication coverage area efficiently.

SUMMARY

It is therefore an object of the present disclosure to provide a coil component capable of efficiently extending the communication coverage area and a wireless power transmitting device having such a coil component.

A coil component according to one embodiment of the present disclosure includes a first coil pattern, a second coil pattern connected to the first coil pattern, and a magnetic member covering the first and second coil patterns in the axial direction thereof. The first and second coil patterns are arranged side by side in a first direction perpendicular to the axial direction. The first coil pattern has a first protrusion protruding in a second direction perpendicular to the axial direction and the first direction from a first outer peripheral end of the magnetic member in the second direction.

BRIEF DESCRIPTION OF THE DRAWINGS

The above features and advantages of the present disclosure will be more apparent from the following description of certain preferred embodiments taken in conjunction with the accompanying drawings, in which.

DETAILED DESCRIPTION OF THE EMBODIMENTS

Preferred embodiments of the present disclosure will be explained below in detail with reference to the accompanying drawings.

Figure 1:
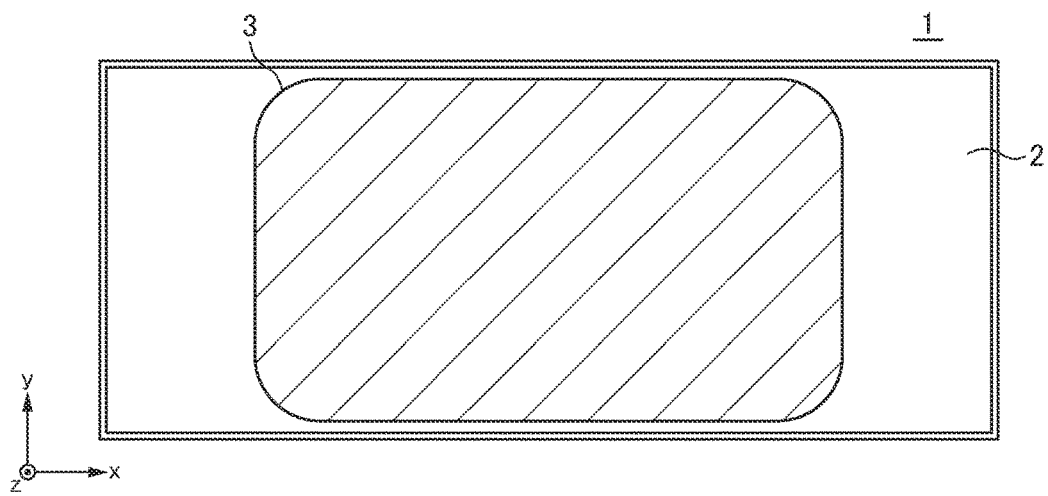
FIG. 1 is a schematic plan view of a terminal holder incorporating a coil component according to one embodiment.

FIG. 1 is a schematic plan view of a terminal holder 1 incorporating a coil component according to one embodiment.

The terminal holder 1 illustrated in FIG. 1 has a placing surface 2 on which a mobile terminal such as a smartphone 3 is placed. The placing surface 2 has an xy plane. A coil pattern for NFC (Near-Field Communication) and a coil pattern for wireless power transmission, which are to be described later, are disposed below (in the z-direction) the placing surface 2. Thus, placing the smartphone 3 on the terminal holder 1 allows near-field communication between the terminal holder 1 and the smartphone 3 and allows the smartphone 3 to be charged through wireless power transmission. The device incorporating the coil component according to the present disclosure is not limited to the terminal holder 1 illustrated in FIG. 1 but may be any device capable of placing thereon the smartphone 3, such as a center console provided the interior of a vehicle.

Figure 2A:
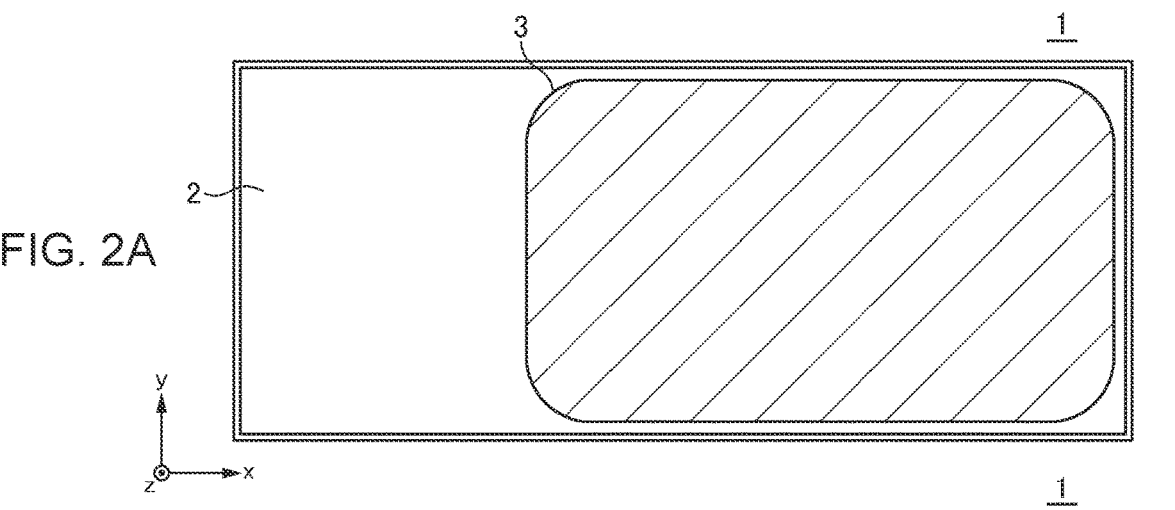
FIGS. 2A and 2B are schematic plan views of the terminal holder 1 in a case where the smartphone 3 is placed offset.
Figure 2B:
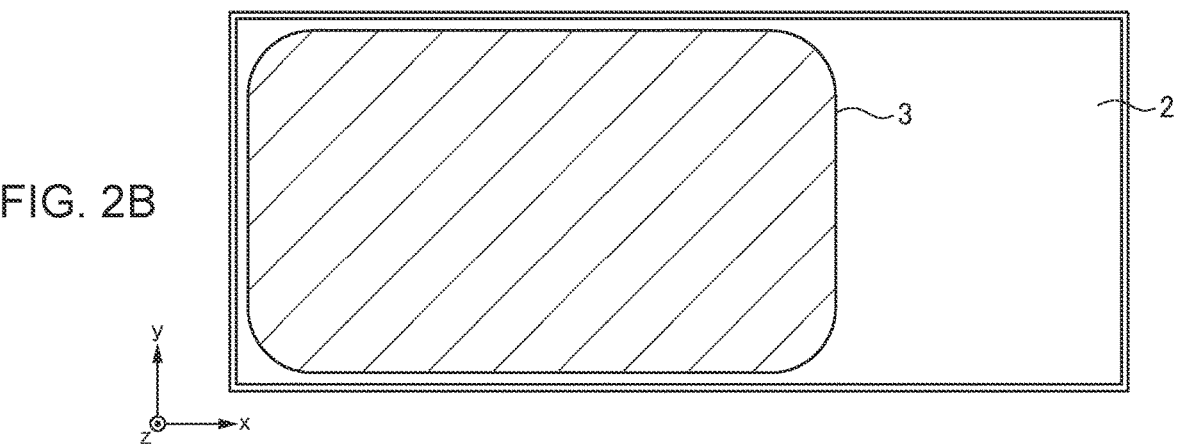

In FIG. 1, the smartphone 3 is placed at substantially the center of the placing surface 2 in the x-direction. However, the width of the placing surface 2 in the x-direction is larger than the length of the smartphone 3 in the x-direction, so that the smartphone 3 may be placed offset in the positive x-direction (three o'clock direction in the drawing) as illustrated in FIG. 2A or may be placed offset in the negative x-direction (nine o'clock direction in the drawing) as illustrated in FIG. 2B. Thus, the terminal holder 1 needs to be designed such that it can perform near-field communication with the smartphone 3 even when the smartphone 3 is placed offset from the center.

Figure 3:
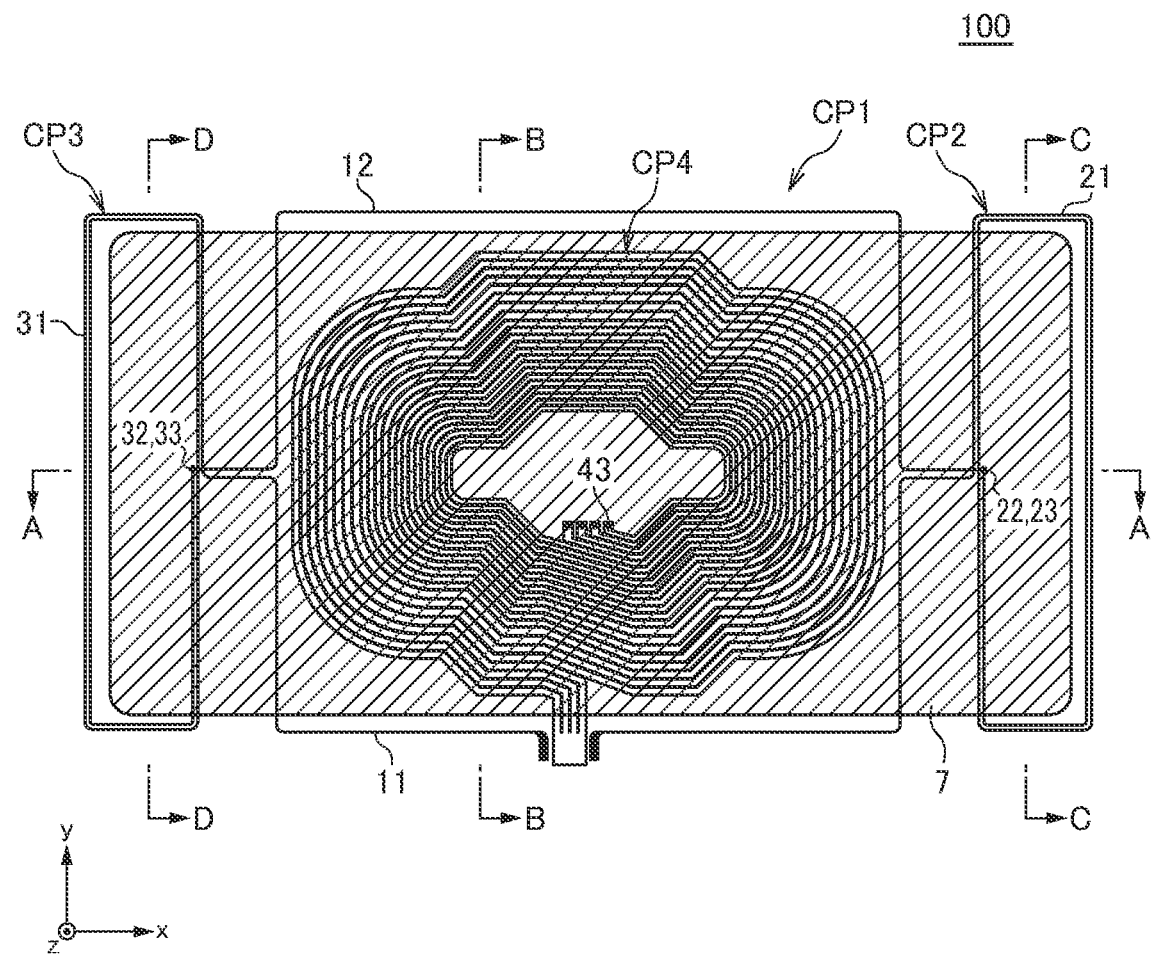
FIG. 3 is a schematic plan view for explaining the structure of a coil component 100 according to one embodiment.
Figure 4:
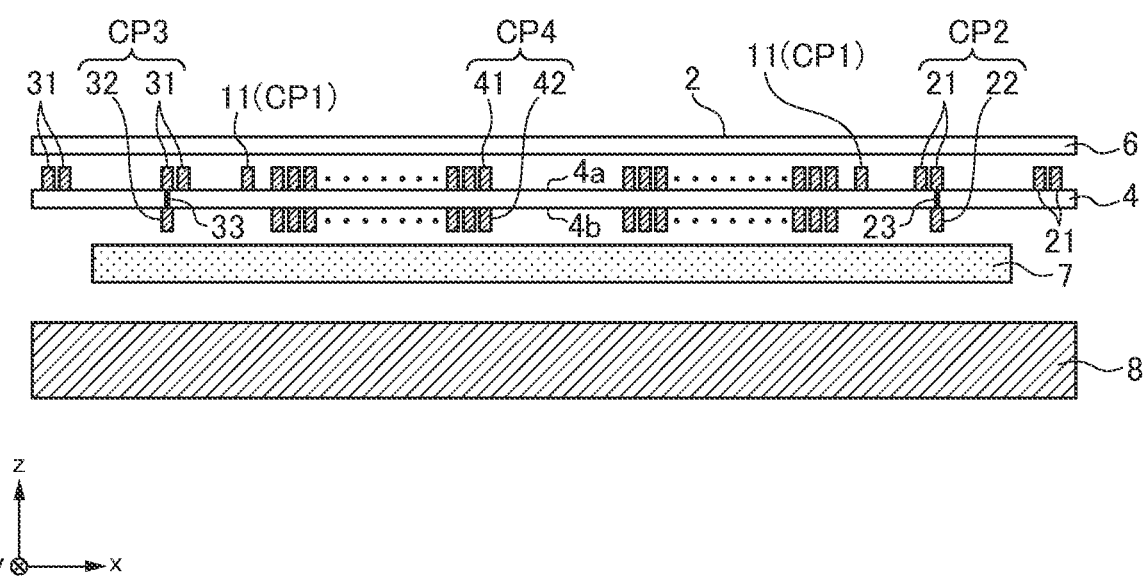
FIG. 4 is a schematic cross-sectional view taken along the line A-A in FIG. 3.
Figure 5:
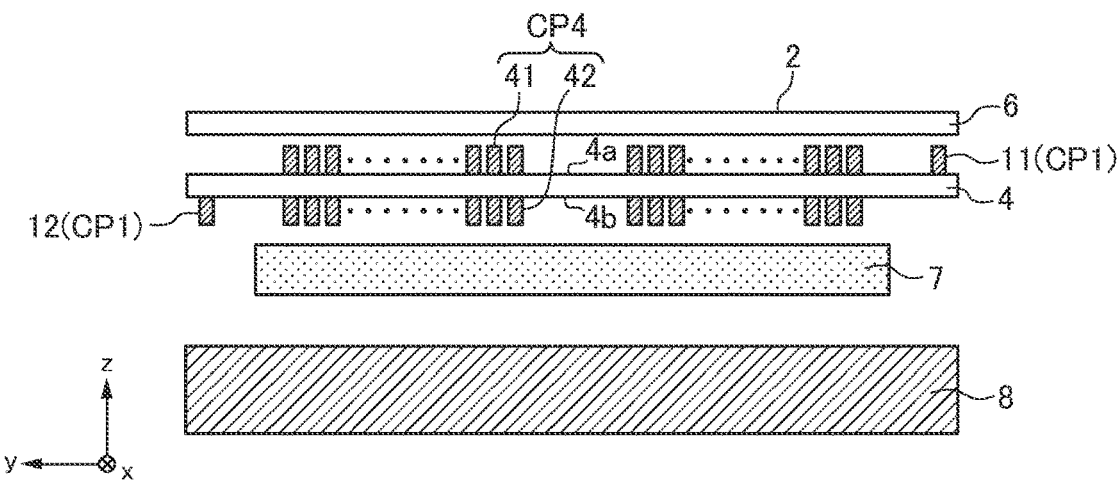
FIG. 5 is a schematic cross-sectional view taken along the line B-B in FIG. 3.
Figure 6:
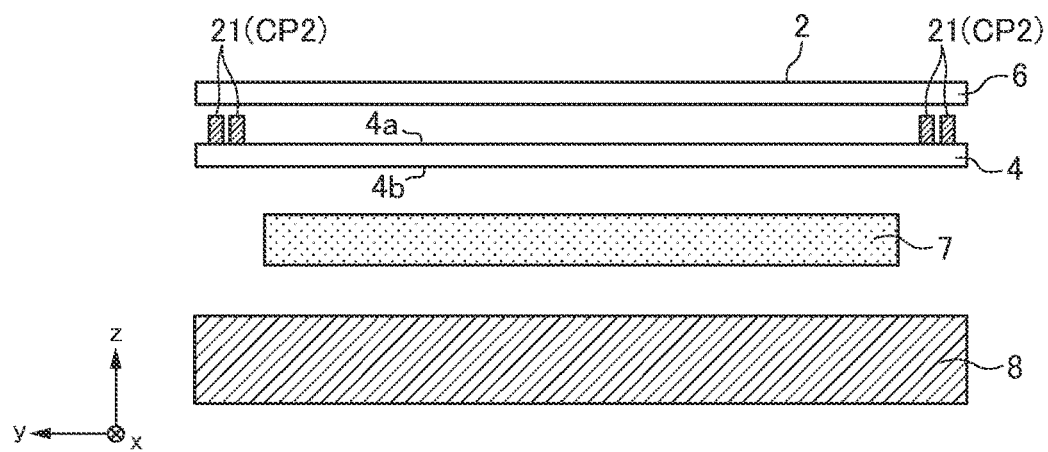
FIG. 6 is a schematic cross-sectional view taken along the line C-C in FIG. 3.
Figure 7:
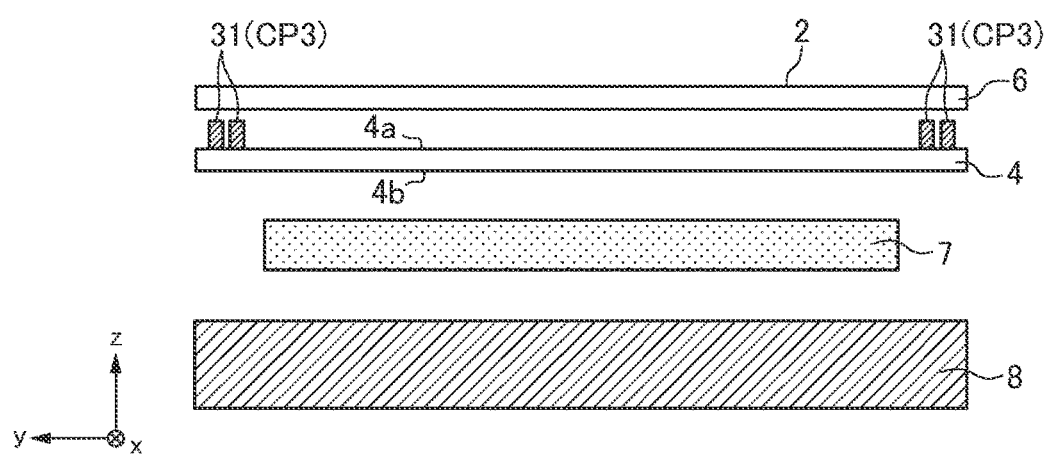
FIG. 7 is a schematic cross-sectional view taken along the line D-D in FIG. 3.

FIG. 3 is a schematic plan view for explaining the structure of a coil component 100 according to one embodiment. FIG. 4 is a schematic cross-sectional view taken along the line A-A in FIG. 3, FIG. 5 is a schematic cross-sectional view taken along the line B-B in FIG. 3, FIG. 6 is a schematic cross-sectional view taken along the line C-C in FIG. 3, and FIG. 7 is a schematic cross-sectional view taken along the line D-D in FIG. 3.

As illustrated in FIGS. 3 to 7, the coil component 100 according to the present embodiment includes a substrate 4 which is, e.g., a PET film, first to fourth coil patterns CP1 to CP4 provided on surfaces 4a and 4b of the substrate 4, and a magnetic member 7. On the back surface of the magnetic member 7, the casing of the terminal holder 1 and a metal member 8 including a circuit board are provided. That is, the magnetic member 7 is arranged between the first to fourth coil patterns CP1 to CP4 and the metal member 8. Typically, the existence of the metal member 8 near the coil pattern deteriorates antenna efficiency; however, in the present embodiment, the magnetic member 7 is arranged between the coil pattern and the metal member, so that the magnetic member 7 functions as a magnetic path to suppress deterioration of antenna efficiency. The upper surfaces of the first to fourth coil patterns CP1 to CP4 are covered with the casing of the terminal holder 1 and an insulating member 6 which is, e.g., a protective film.

The first to third coil patterns CP1 to CP3 are each an antenna coil for NFC, and the fourth coil pattern CP4 is a power transmitting coil for wireless power transmission. The first to third coil patterns CP1 to CP3 are arranged side by side such that the first coil pattern CP1 is interposed between the second and third coil patterns CP2 and CP3. The first coil pattern CP1 located at the center serves as a main antenna for performing communication around substantially the center portion in the x-direction, and the second and third coil patterns CP2 and CP3 located on both sides of the first coil pattern CP1 in the x-direction each serve as a sub antenna for extending the communication coverage area in the x-direction. The axial directions of the first to third coil patterns CP1 to CP3 are each the z-direction. Such an arrangement in which the second and third coil patterns CP2 and CP3 (sub antennas) are arranged on both sides of the first coil pattern CP1 (main antenna) allows the communication coverage area to extend in the x-direction. Thus, in whichever position on the placing surface 2 the smartphone 3 is placed, near-field communication can be performed properly. The x-direction is an example of a first direction, and the y-direction is an example of a second direction.

The first to third coil patterns CP1 to CP3 each have an opening. In the example illustrated in FIGS. 3 to 7, the opening width of the first coil pattern CP1 in the x-direction is larger than those of the second and third coil patterns CP2 and CP3 in the x-direction. The opening width in the y-direction is the same for all the first to third coil patterns CP1 to CP3. The fourth coil pattern CP4 is arranged inside the opening area of the first coil pattern CP1. The axial direction of the coil pattern CP4 is also the x-direction. The coil axes of the first and fourth coil patterns CP1 and CP4 may coincide with each other or may differ from each other in position in the x- or y-direction. Such an arrangement in which the fourth coil pattern CP4 is arranged inside the opening area of the coil pattern CP1 allows all the first to fourth coil patterns CP1 to CP4 to be formed on surfaces of the substrate 4, thus reducing the number of components. Further, the first to fourth coil patterns CP1 to CP4 can be formed at a time, thus simplifying the production process.

The first coil pattern CP1 includes a conductor pattern 11 formed on the surface 4a of the substrate 4 and a conductor pattern 12 formed on the surface 4b of the substrate 4. The second coil pattern CP2 includes a conductor pattern 21 formed on the surface 4a of the substrate 4, a conductor pattern 22 formed on the surface 4b of the substrate 4, and a via conductor 23 penetrating the substrate 4 so as to connect the conductor patters 21 and 22. The third coil pattern CP3 includes a conductor pattern 31 formed on the surface 4a of the substrate 4, a conductor pattern 32 formed on the surface 4b of the substrate 4, and a via conductor 33 penetrating the substrate 4 so as to connect the conductor patterns 31 and 32. The fourth coil pattern CP4 includes a conductor pattern 41 formed on the surface 4a of the substrate 4, a conductor pattern 42 formed on the surface 4b of the substrate 4, and a via conductor 43 penetrating the substrate 4 so as to connect the conductor patterns 41 and 42.

The first to third coil patterns CP1 to CP3 are connected in series to constitute one antenna coil.

The first coil pattern CP1 has about one turn, and the second and third coil patterns CP2 and CP3 each have about two turns in the example illustrated in FIGS. 3 to 7, while the number of turns of each of the first to third coil patterns CP1 to CP3 is not limited to a particular value. When the numbers of turns of the second and third coil patterns CP2 and CP3 (sub antennas) are each made larger than the number of turns of the first coil pattern CP1 (main antenna) as in the example illustrated in FIGS. 3 to 7, antenna characteristics on both sides in the x-direction can be enhanced. On the other hand, when the number of turns of the first coil pattern CP1 (main antenna) is made larger than the numbers of turns of the second and third coil patterns CP2 and CP3 (sub antennas), antenna characteristics at substantially the center portion in the x-direction can be enhanced. The fourth coil pattern CP4, which is a power transmitting coil for wireless power transmission, requires a large inductance and is thus made larger in the number of turns than the first to third coil patterns.

The fourth coil pattern CP4 for wireless power transmission is entirely covered with the magnetic member 7 in the z-direction. On the other hand, for the first to third coil patterns CP1 to CP3 for NFC, although most part of the opening area overlaps the magnetic member 7 in the z-direction, a part thereof does not overlap the magnetic member 7. That is, the first to third coil patterns CP1 to CP3 each have a protrusion protruding in the x- or y-direction from the outer peripheral end of the magnetic member 7.

Figure 8:
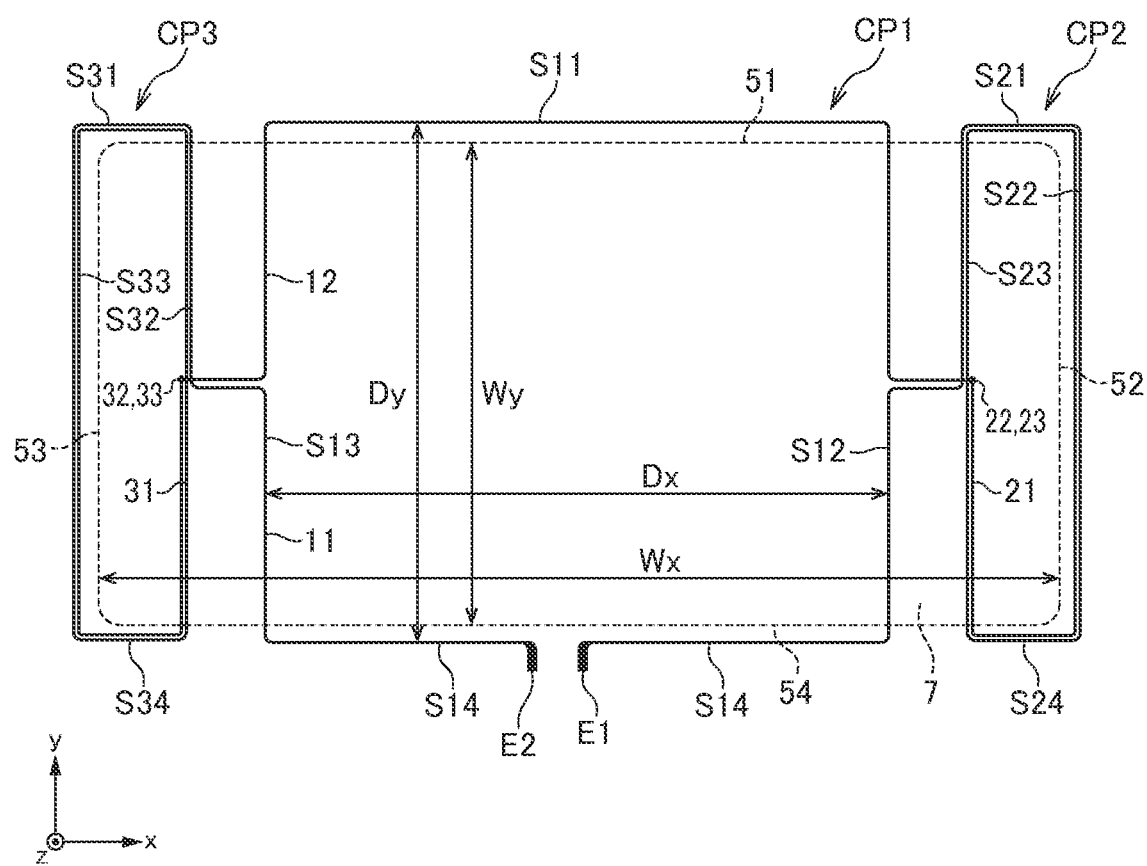
FIG. 8 is a schematic view for explaining in more detail the positional relation between the first to third coil patterns CP1 to CP3 and the magnetic member 7.

FIG. 8 is a schematic view for explaining in more detail the positional relation between the first to third coil patterns CP1 to CP3 and the magnetic member 7.

As illustrated in FIG. 8, the magnetic member 7 has outer peripheral ends 51 to 54. The outer peripheral end 51 is the end portion of the magnetic member 7 in the positive y-direction (twelve o'clock direction in the drawing) and extends in the x-direction. The outer peripheral end 52 is the end portion of the magnetic member 7 in the positive x-direction (three o'clock direction in the drawing) and extends in the y-direction. The outer peripheral end 53 is the end portion of the magnetic member 7 in the negative x-direction (nine o'clock direction in the drawing) and extends in the y-direction. The outer peripheral end 54 is the end portion of the magnetic member 7 in the negative y-direction (six o'clock direction in the drawing) and extends in the x-direction. The width Wy of the magnetic member 7 in the y-direction, i.e., the distance between the outer peripheral ends 51 and 54 is smaller than the opening width Dy of each of the first to third coil patterns CP1 to CP3 in the y-direction. On the other hand, the width Wx of the magnetic member 7 in the x-direction, i.e., the distance between the outer peripheral ends 52 and 53 is larger than the opening width Dx of the first coil pattern CP1 in the x-direction. The outer peripheral end 51 is an example of a first outer peripheral end, the outer peripheral end 52 is an example of a second outer peripheral end, and the outer peripheral end 53 is an example of a third outer peripheral end.

The first coil pattern CP1 has sections S11 to S14. The section S11 is positioned in the positive y-direction (twelve o'clock direction in the drawing) and extends in the x-direction. The section S12 is positioned in the positive x-direction (three o'clock direction in the drawing) and extends in the y-direction. The section S13 is positioned in the negative x-direction (nine o'clock direction in the drawing) and extends in the y-direction. The section S14 is positioned in the negative y-direction (six o'clock direction in the drawing) and extends in the x-direction. The sections S12 and 13 overlap in most parts thereof the magnetic member 7, while the sections S11 and S14 do not overlap the magnetic member 7. That is, the section S11 constitutes a protrusion (first protrusion) protruding in the positive y-direction from the outer peripheral end 51 of the magnetic member 7, and the section S14 constitutes a protrusion protruding in the negative y-direction from the outer peripheral end 54 of the magnetic member 7. The sections S11 and S14 of the first coil pattern CP1 thus each constitute the protrusion that does not overlap the magnetic member 7 in the z-direction, so that magnetic flux is suppressed from extending in the positive and negative y-directions but correspondingly extends in the positive and negative x-directions.

The section S11 is constituted by the conductor pattern 12, and the section S14 is constituted by the conductor pattern 11. A part of the section S12 that is constituted by the conductor pattern 12 is connected to one end of the conductor pattern 21 constituting the second coil pattern CP2 through the conductor pattern 22 and via conductor 23. The other end of the conductor pattern 21 is connected to a part of the section S12 that is constituted by the conductor pattern 11. Similarly, a part of the section S13 that is constituted by the conductor pattern 12 is connected to one end of the conductor pattern 31 constituting the third coil pattern CP3 through the conductor pattern 32 and via conductor 33. The other end of the conductor pattern 31 is connected to a part of the section S13 that is constituted by the conductor pattern 11. The section S14 is terminated at a pair of terminals E1 and E2. In the example illustrated in FIG. 8, the first coil pattern CP1 has a connecting pattern extending in the x-direction so as to connect the conductor patterns 12 and 22 and a connecting pattern extending in the x-direction so as to connect the conductor patterns 11 and 21. The widths of these connection patterns in the x-direction are smaller than the opening width of the second coil pattern CP2 in the x-direction. Similarly, the first coil pattern CP1 has a connecting pattern extending in the x-direction so as to connect the conductor patterns 12 and 32 and a connecting pattern extending in the x-direction so as to connect the conductor patterns 11 and 31. The widths of these connection patterns in the x-direction are smaller than the opening width of the third coil pattern CP3 in the x-direction.

The winding direction of the first coil pattern CP1 and the winding directions of the second and third coil patterns CP2 and CP3 are opposite. Thus, for example, when a current is made to flow from the terminal E1 to the terminal E2, the current flows in the first coil pattern CP1 in the left-hand direction (counterclockwise direction), and the current flows in the second and third coil patterns CP2 and CP3 in the right-handed direction (clockwise direction). The first to third coil patterns CP1 to C3 are thus connected such that the magnetic flux generated from the first coil pattern CP1 and the magnetic fluxes generated from the second and third coil patterns CP2 and CP3 have mutually opposite phases, with the result that the magnetic flux generated from the first coil pattern CP1 and the magnetic fluxes generated from the second and third coil patterns CP2 and CP3 mainly strengthen each other.

The second coil pattern CP2 has sections S21 to S24. The section S21 is positioned in the positive y-direction (twelve o'clock direction in the drawing) and extends in the x-direction. The section S22 is positioned in the positive x-direction (three o'clock direction in the drawing) and extends in the y-direction. The section S23 is positioned in the negative x-direction (nine o'clock direction in the drawing) and extends in the y-direction. The section S24 is positioned in the negative y-direction (six o'clock direction in the drawing) and extends in the x-direction. The section S23 overlaps in most part thereof the magnetic member 7, while the sections S21, S22, and S24 do not overlap the magnetic member 7. That is, the section S21 constitutes a protrusion (third protrusion) protruding in the positive y-direction from the outer peripheral end 51 of the magnetic member 7, the section S22 constitutes a protrusion (second protrusion) protruding in the positive x-direction from the outer peripheral end 52 of the magnetic member 7, and the section S24 constitutes a protrusion protruding in the negative y-direction from the outer peripheral end 54 of the magnetic member 7. The sections S21 and S24 of the second coil pattern CP2 thus each constitute the protrusion that does not overlap the magnetic member 7 in the z-direction, so that the magnetic flux is suppressed from extending in the positive and negative y-directions but correspondingly extends in the positive x-direction.

The third coil pattern CP3 has sections S31 to S34. The section S31 is positioned in the positive y-direction (twelve o'clock direction in the drawing) and extends in the x-direction. The section S32 is positioned in the positive x-direction (three o'clock direction in the drawing) and extends in the y-direction. The section S33 is positioned in the negative x-direction (nine o'clock direction in the drawing) and extends in the y-direction. The section S34 is positioned in the negative y-direction (six o'clock direction in the drawing) and extends in the x-direction. The section S32 overlaps in most part thereof the magnetic member 7, while the sections S31, S33, and S34 do not overlap the magnetic member 7. That is, the section S31 constitutes a protrusion (fifth protrusion) protruding in the positive y-direction from the outer peripheral end 51 of the magnetic member 7, the section S33 constitutes a protrusion (fourth protrusion) protruding in the negative x-direction from the outer peripheral end 53 of the magnetic member 7, and the section S34 constitutes a protrusion protruding in the negative y-direction from the outer peripheral end 54 of the magnetic member 7. The sections S31 and S34 of the third coil pattern CP3 thus each constitute the protrusion that does not overlap the magnetic member 7 in the z-direction, so that the magnetic flux is suppressed from extending in the positive and negative y-directions but correspondingly extends in the negative x-direction.

Figure 9A:
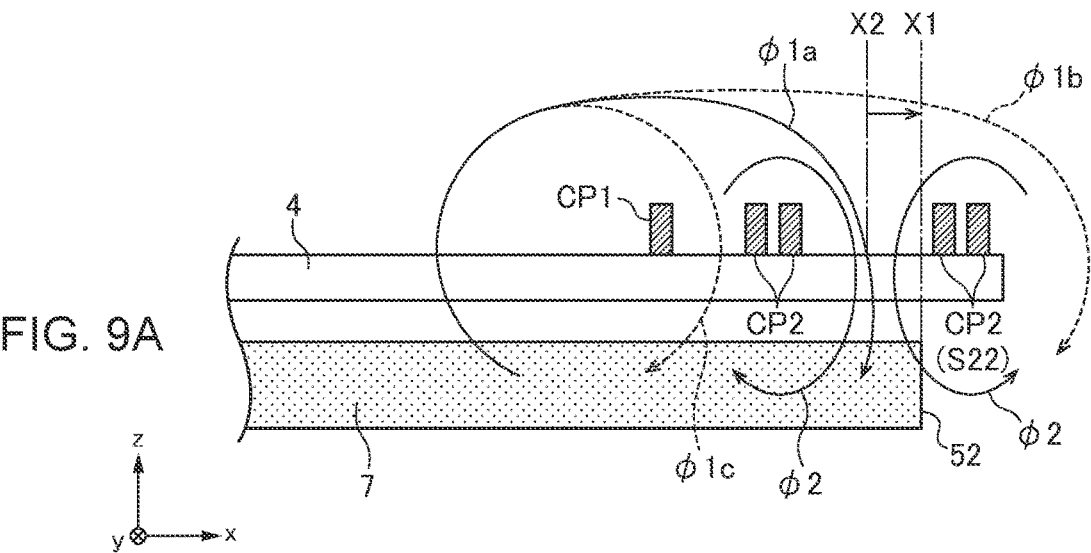
FIGS. 9A to 9C are schematic views for explaining a change in the magnetic flux depending on the position of the outer peripheral end 52 of the magnetic member 7.
Figure 9B:
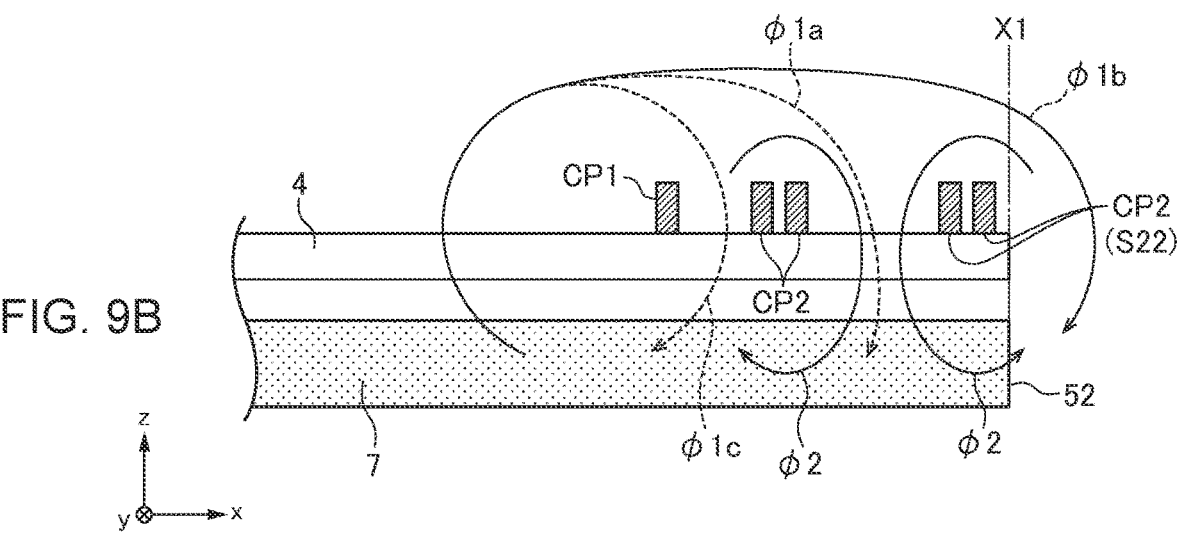
Figure 9C:
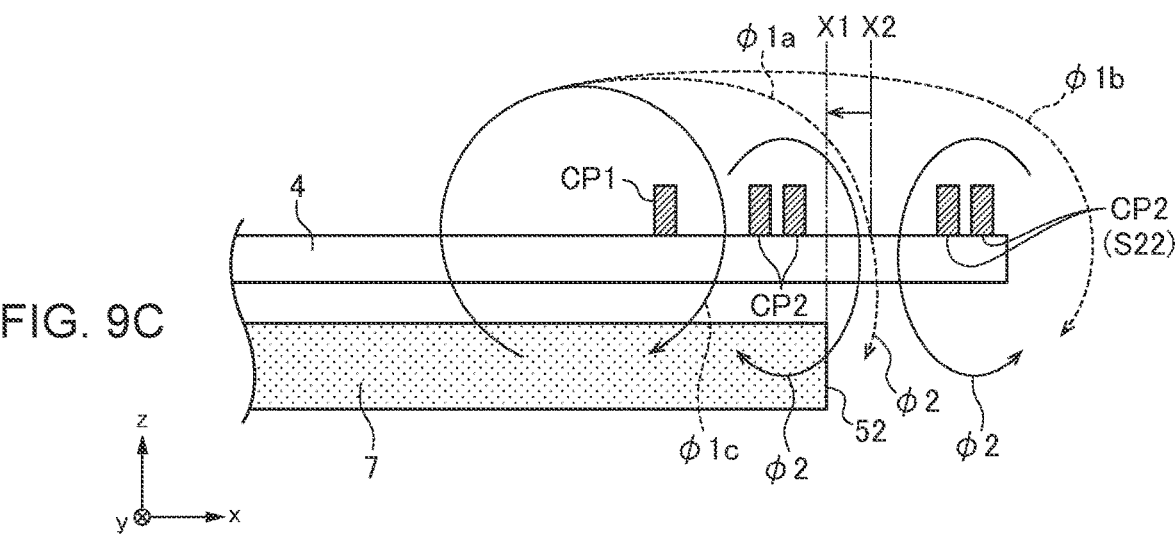

FIGS. 9A to 9C are schematic views for explaining a change in the magnetic flux depending on the position of the outer peripheral end 52 of the magnetic member 7.

FIG. 9A illustrates a case where the position X1 of the outer peripheral end 52 of the magnetic member 7 in the x-direction overlaps the opening area of the second coil pattern CP2. In this case, a magnetic flux $\phi 1a$ generated from the first coil pattern CP1 and a magnetic flux $\phi 2$ generated from the second coil pattern CP2 strengthen each other, whereby the communication coverage area extends in the positive x-direction. In particular, when the position X1 of the outer peripheral end 52 of the magnetic member 7 in the x-direction is located in the positive x-direction relative to the center position X2 of the second coil pattern CP2 in the x-direction, that is, when the distance between the position X1 and the section S22 of the second coil pattern CP2 is less than ½ of the opening width of the second coil pattern CP2 in the x-direction, the communication coverage area extends largely in the positive x-direction. The magnetic flux generated from the first coil pattern CP1 includes components $\phi 1b$ and $\phi 1c$ which act so as to cancel the magnetic flux φ2; however, in the example illustrated in FIG. 9A, the components φ1b and φ1c are included in comparatively small amounts.

On the other hand, as illustrated in FIG. 9B, when the section S22 of the second coil pattern CP2 does not protrude in the positive x-direction from the magnetic member 7, the magnetic flux component φ1b increases, so that the extension of the communication coverage area in the positive x-direction is suppressed as compared with the case of FIG. 9A. Further, as illustrated in FIG. 9C, when the position X1 of the outer peripheral end 52 of the magnetic member 7 in the x-direction is located in the negative x-direction relative to the center position X2 of the second coil pattern CP2 in the x-direction, that is, when the distance between the position X1 and the section S22 of the second coil pattern CP2 is equal to or more than ½ of the opening width of the second coil pattern CP2 in the x-direction, the magnetic flux component φ1c increases, so that the extension of the communication coverage area in the positive x-direction is suppressed as compared with the case of FIG. 9A. Considering the above, the position X1 of the outer peripheral end 52 of the magnetic member 7 in the x-direction and the second coil pattern CP2 preferably have the positional relation illustrated in FIG. 9A. The same applies for the positional relation between the position of the outer peripheral end 53 of the magnetic member 7 in the x-direction and the third coil pattern CP3, although not illustrated.

As described above, in the present embodiment, the first to third coil patterns CP1 to CP3 and the magnetic member 7 have the positional relation described above, so that the magnetic fluxes interlinking with the first to third coil patterns CP1 to CP3 extend in the positive and negative directions. As a result, in whichever position on the placing surface 2 of the terminal holder 1 the smartphone 3 is placed, communication between the terminal holder 1 and the smartphone 3 can be performed properly.

Figure 10:
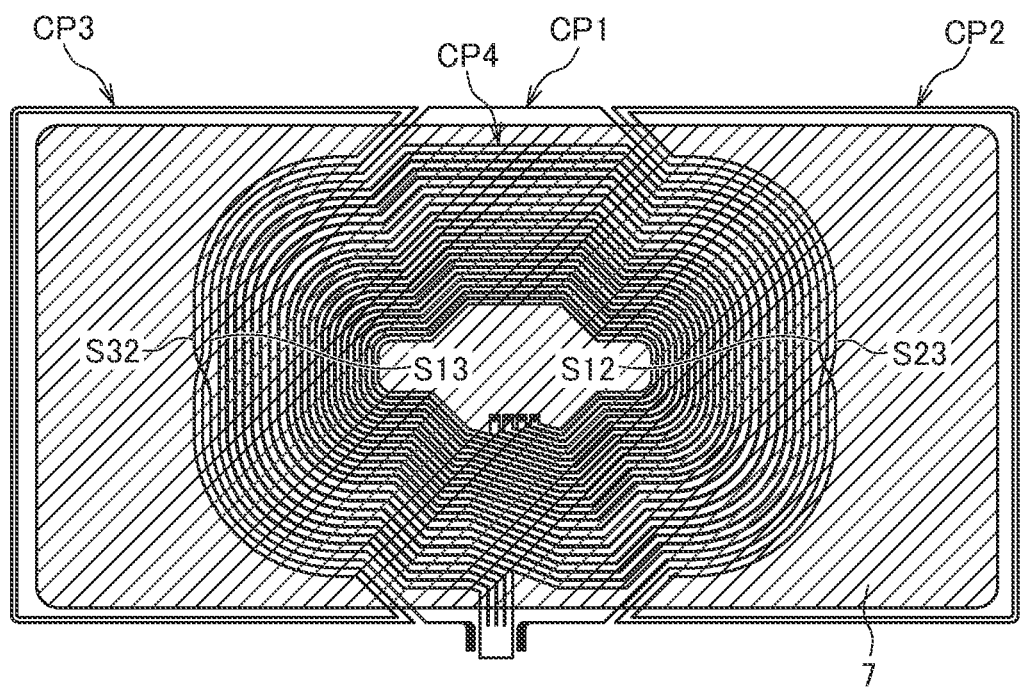
FIG. 10 is a schematic plan view for explaining the structure of a coil component 100a according to a modification.

FIG. 10 is a schematic plan view for explaining the structure of a coil component 100a according to a modification.

The coil component 100a illustrated in FIG. 10 differs from the above-described coil component 100 in that the first coil pattern CP1 is provided along the outer shape of the fourth coil pattern CP4 and that the second and third coil patterns CP2 and CP3 are partly provided along the first coil pattern CP1. More specifically, the sections S12 and S13 each include a part whose coordinate in the x-direction changes along the winding direction, and accordingly, the section S23 of the second coil pattern CP2 provided along the section S12 of the first coil pattern CP1 and the section S32 of the third coil pattern CP3 provided along the section S13 of the first coil pattern CP1 each have a part whose coordinate in the x-direction changes along the winding direction. As exemplified by the coil component 100a of FIG. 10, the first coil pattern CP1 and the second and third coil patterns CP2 and CP3 may partly overlap in the y-direction. It follows that the sections S23 and S32 of the second and third coil patterns CP2 and CP3 partly extend toward the center in the x-direction, thus enhancing antenna characteristics at substantially the center portion in the x-direction.

Figure 11:
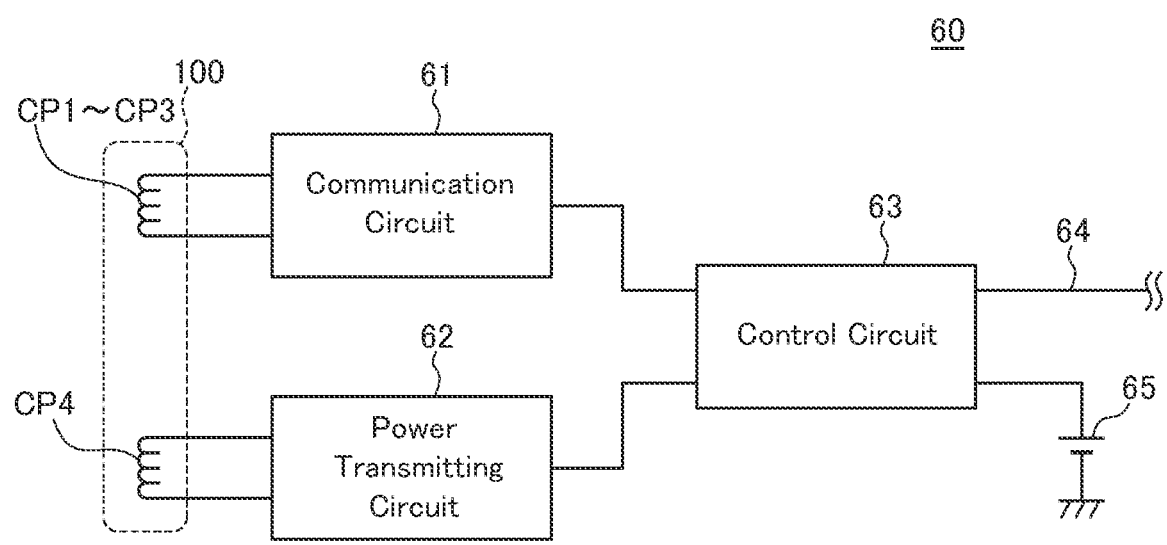
FIG. 11 is a block diagram of a wireless power transmitting device 60 including the coil component 100.

FIG. 11 is a block diagram of a wireless power transmitting device 60 including the coil component 100 according to the present embodiment.

The wireless power transmitting device 60 illustrated in FIG. 11 includes the coil component 100 having the first to fourth coil patterns CP1 to CP4, a communication circuit 61 connected to the first to third coil patterns CP1 to CP3, and a power transmitting circuit 62 connected to the fourth coil pattern CP4. The communication circuit 61 and power transmitting circuit 62 are connected to a control circuit 63. Thus, data transmitted and received through a communication line 64 can be exchanged with the smartphone 3 through the first to third coil patterns CP1 to CP3 for NFC, and power supplied from a power supply 65 can be transmitted wirelessly to the smartphone 3 through the fourth coil pattern CP4 for wireless power transmission.

As described above, according to the present embodiment, there can be provided a coil component 100 suitable for a terminal holder 1 capable of performing communication with a mobile terminal through NFC and charging the mobile terminal through wireless power transmission.

While the preferred embodiment of the present invention has been described, the present invention is not limited to the above embodiment, and various modifications may be made within the scope of the present invention, and all such modifications are included in the present invention.

The technology according to the present disclosure includes the following configuration examples, but not limited thereto.

A coil component according to one embodiment of the present disclosure includes a first coil pattern, a second coil pattern connected to the first coil pattern, and a magnetic member covering the first and second coil patterns in the axial direction thereof. The first and second coil patterns are arranged side by side in a first direction perpendicular to the axial direction. The first coil pattern has a first protrusion protruding in a second direction perpendicular to the axial direction and the first direction from a first outer peripheral end of the magnetic member in the second direction.

In the coil component, magnetic flux is suppressed from extending in the second direction but correspondingly extends in the first direction, thus efficiently extending the communication coverage area.

The second coil pattern may have a second protrusion protruding in the first direction from a second outer peripheral end on one side of the magnetic member in the first direction. With this configuration, outside the second coil pattern, the magnetic flux generated from the first coil pattern and the magnetic flux generated from the second coil pattern are suppressed from weakening each other.

The distance between the second protrusion and the second outer peripheral end of the magnetic member in the first direction may be less than ½ of the opening width of the second coil pattern in the first direction. With this configuration, the communication coverage area extends largely in the first direction.

The second coil pattern may have a third protrusion protruding in the second direction from the first outer peripheral end of the magnetic member. With this configuration, the magnetic flux is suppressed from extending in the second direction but correspondingly extends sufficiently in the first direction.

The first and second coil patterns may partly overlap each other in the second direction. In this case, a first section of the first coil pattern that overlaps the magnetic member may include a part whose coordinate in the first direction changes along the winding direction, and a second section of the second coil pattern may be provided along the first section. With this configuration, antenna characteristics at substantially the center portion in the first direction can be enhanced.

The coil component may further include a third coil pattern connected to the first coil pattern, and the first coil pattern may be arranged between the second and third coil patterns. With this configuration, the communication coverage area extends in the first direction.

The third coil pattern may have a fourth protrusion protruding in the first direction from a third outer peripheral end on the other side of the magnetic member in the first direction. With this configuration, outside the third coil pattern, the magnetic flux generated from the first coil pattern and the magnetic flux generated from the third coil pattern are suppressed from weakening each other.

The distance between the fourth protrusion and the third outer peripheral end of the magnetic member in the first direction may be less than ½ of the opening width of the third coil pattern in the first direction. With this configuration, the communication coverage area extends largely in the first direction.

The third coil pattern may have a fifth protrusion protruding in the second direction from the first outer peripheral end of the magnetic member. With this configuration, the magnetic flux is suppressed from extending in the second direction but correspondingly extends sufficiently in the first direction.

The first and third coil patterns may partly overlap each other in the second direction. In this case, a third section of the first coil pattern that overlaps the magnetic member may include a part whose coordinate in the first direction changes along the winding direction, and a fourth section of the third coil pattern may be provided along the third section. With this configuration, antenna characteristics at substantially the center portion in the first direction can be enhanced.

The first to third coil patterns may be connected such that the magnetic flux generated from the first coil pattern and the magnetic fluxes generated from the second and third coil patterns have mutually opposite phases. With this configuration, the magnetic flux generated from the first coil pattern and the magnetic fluxes generated from the second and third coil patterns mainly strengthen each other.

The number of turns of each of the second and third coil patterns may be larger than the number of turns of first coil pattern. With this configuration, antenna characteristics on both sides in the first direction can be enhanced The coil component may further include a fourth coil pattern arranged inside the opening area of the first coil pattern and having the same axial direction as the first coil pattern. In this case, the coil pattern may further include a substrate, and the first, second, and fourth coil patterns may be provided on at least one surface of the substrate. With this configuration, the first, second, and fourth coil patterns can be formed on surfaces of the substrate, thus reducing the number of components. Further, the first, second, and fourth coil patterns can be formed at a time, thus simplifying the production process.

A wireless power transmitting device according to the embodiment of the present disclosure includes the coil component described above, a communication circuit connected to the first and second coil patterns, and a power transmitting circuit connected to the fourth coil pattern.

With the wireless power transmitting device of the present disclosure, the communication coverage area can be extended efficiently.

What is claimed is:
1. A coil component comprising:
a first coil pattern;
a second coil pattern directly connected to the first coil pattern; and
a magnetic member covering the first and second coil patterns in an axial direction of the first and second coil patterns,
wherein the first and second coil patterns are arranged side by side in a first direction perpendicular to the axial direction, and
wherein the first coil pattern has a first protrusion protruding in a second direction perpendicular to the axial direction and the first direction from a first outer peripheral end of the magnetic member in the second direction.

2. The coil component as claimed in claim 1, wherein the second coil pattern has a second protrusion protruding in the first direction from a second outer peripheral end on one side of the magnetic member in the first direction.

3. The coil component as claimed in claim 2, wherein a distance between the second protrusion and the second outer peripheral end of the magnetic member in the first direction is less than ½ of an opening width of the second coil pattern in the first direction.

4. The coil component as claimed in claim 1, wherein the second coil pattern has a third protrusion protruding in the second direction from the first outer peripheral end of the magnetic member.

5. The coil component as claimed in claim 1, wherein the first and second coil patterns partly overlap each other in the second direction.

6. The coil component as claimed in claim 5,
wherein the first coil pattern has a first section that overlaps the magnetic member, the first section including a part whose coordinate in the first direction changes along a winding direction, and
wherein the second coil pattern has a second section provided along the first section.

7. The coil component as claimed in claim 1, further comprising a third coil pattern connected to the first coil pattern,
wherein the first coil pattern is arranged between the second and third coil patterns.

8. The coil component as claimed in claim 7, wherein the third coil pattern has a fourth protrusion protruding in the first direction from a third outer peripheral end on other side of the magnetic member in the first direction.

9. The coil component as claimed in claim 7, wherein the third coil pattern has a fifth protrusion protruding in the second direction from the first outer peripheral end of the magnetic member.

10. The coil component as claimed in claim 7, wherein the first and third coil patterns partly overlap each other in the second direction.

11. The coil component as claimed in claim 10,
wherein the first coil pattern has a third section that overlaps the magnetic member, the third section including a part whose coordinate in the first direction changes along a winding direction, and
wherein the third coil pattern has a fourth section provided along the third section.

12. The coil component as claimed in claim 7, wherein the first to third coil patterns are connected such that a magnetic flux generated from the first coil pattern and a magnetic fluxes generated from the second and third coil patterns have mutually opposite phases.

13. The coil component as claimed in claim 7, wherein a number of turns of each of the second and third coil patterns is larger than a number of turns of first coil pattern.

14. The coil component as claimed in claim 1, further comprising a fourth coil pattern arranged inside an opening area of the first coil pattern and having a same axial direction as the first coil pattern.

15. The coil component as claimed in claim 14, further comprising a substrate,
wherein the first, second, and fourth coil patterns are provided on at least one surface of the substrate.

16. A wireless power transmitting device comprising:
a coil component comprising:
a first coil pattern;
a second coil pattern directly connected to the first coil pattern;
a fourth coil pattern arranged inside an opening area of the first coil pattern; and
a magnetic member covering the first, second, and fourth coil patterns in an axial direction of the first, second, and fourth coil patterns;
a communication circuit connected to the first and second coil patterns; and
a power transmitting circuit connected to the fourth coil pattern,
wherein the first and second coil patterns are arranged side by side in a first direction perpendicular to the axial direction, and
wherein the first coil pattern has a first protrusion protruding in a second direction perpendicular to the axial direction and the first direction from a first outer peripheral end of the magnetic member in the second direction.

17. A coil component comprising:
a first coil pattern;
a second coil pattern connected to the first coil pattern;
a third coil pattern connected to the first coil pattern; and
a magnetic member covering the first, second, and third coil patterns in an axial direction of the first, second, and third coil patterns,
wherein the first coil pattern is arranged between the second and third coil patterns in a first direction perpendicular to the axial direction,
wherein the first coil pattern has a first protrusion protruding in a second direction perpendicular to the axial direction and the first direction from a first outer peripheral end of the magnetic member in the second direction,
wherein the third coil pattern has a second protrusion protruding in the first direction from a second outer peripheral end of the magnetic member in the first direction, and
wherein a distance between the second protrusion and the second outer peripheral end of the magnetic member in the first direction is less than ½ of an opening width of the third coil pattern in the first direction.

18. The coil component as claimed in claim 1, wherein the first and second coil patterns are arranged such that an opening area of the first coil pattern does not overlap an opening area of the second coil pattern.

19. The coil component as claimed in claim 1, wherein the first and second coil patterns are formed on a substrate having an insulating property.

20. The coil component as claimed in claim 19, wherein the first and second coil patterns are connected to each other on the substrate.

* * * * *